(12) United States Patent
Nakamura et al.

(10) Patent No.: US 11,716,048 B2
(45) Date of Patent: Aug. 1, 2023

(54) ROTARY ELECTRIC MACHINE CONTROL DEVICE

(71) Applicant: DENSO CORPORATION, Kariya (JP)

(72) Inventors: Kouichi Nakamura, Kariya (JP); Nobuyori Nakazima, Kariya (JP); Go Endoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/657,068

(22) Filed: Mar. 29, 2022

(65) Prior Publication Data

US 2022/0224275 A1 Jul. 14, 2022

Related U.S. Application Data

(63) Continuation of application No. PCT/JP2020/036511, filed on Sep. 28, 2020.

(30) Foreign Application Priority Data

Oct. 1, 2019 (JP) ................................. 2019-181510

(51) Int. Cl.
| | | |
|---|---|---|
| *H02P 27/08* | (2006.01) | |
| *H02P 27/06* | (2006.01) | |
| *H02P 21/22* | (2016.01) | |
| *H02P 29/024* | (2016.01) | |
| *B62D 5/04* | (2006.01) | |

(52) U.S. Cl.
CPC .......... *H02P 29/027* (2013.01); *B62D 5/0487* (2013.01)

(58) Field of Classification Search
CPC .......... H02P 27/08; H02P 27/06; H02P 21/22; H02P 29/027; H02P 7/29; B62D 5/0487; B62D 5/0481
See application file for complete search history.

(56) References Cited

U.S. PATENT DOCUMENTS 8,384,336 B2 * 2/2013 Gunji ...................... H02M 1/38
318/400.26
2006/0076832 A1 4/2006 Matsushita et al.
(Continued)

FOREIGN PATENT DOCUMENTS

| JP | 2003-164159 A | 6/2003 |
|---|---|---|
| JP | 2003-237597 A | 8/2003 |
| JP | 2009-118633 A | 5/2009 |

*Primary Examiner* — Thai T Dinh
(74) *Attorney, Agent, or Firm* — Maschoff Brennan

(57) ABSTRACT

A current detection unit includes current detection elements provided to phases on a high potential side of an upper arm element or on a low potential side of a lower arm element. A detection target element is the upper arm element or the lower arm element to which the current detection elements are provided. A target duty is a duty ratio of the detection target element. The control unit includes a current acquisition unit, an energization control unit, and an abnormality determination unit. The current acquisition unit acquires a current detection value from the current detection unit. The abnormality determination unit performs an abnormality determination based on the current detection value. The abnormality determination unit varies a determination threshold, which is used for the abnormality determination based on the current detection value, according to the target duty.

9 Claims, 9 Drawing Sheets

(56) References Cited

U.S. PATENT DOCUMENTS

| | | | |
|---|---|---|---|
| 2008/0315809 A1* | 12/2008 | Tamaizumi | H02P 21/22 |
| | | | 318/400.23 |
| 2011/0248657 A1 | 10/2011 | Endoh | |
| 2015/0214882 A1* | 7/2015 | Suzuki | H02P 29/0241 |
| | | | 318/400.27 |
| 2016/0200355 A1 | 7/2016 | Mori et al. | |
| 2019/0028046 A1 | 1/2019 | Aoki et al. | |
| 2019/0280638 A1* | 9/2019 | Saito | H02P 29/0241 |

* cited by examiner

ROTARY ELECTRIC MACHINE CONTROL DEVICE

CROSS REFERENCE TO RELATED APPLICATION

The present application is a continuation application of International Patent Application No. PCT/JP2020/036511 filed on Sep. 28, 2020, which designated the U. S. and claims the benefit of priority from Japanese Patent Application No. 2019-181510 filed on Oct. 1, 2019. The entire disclosures of all of the above applications are incorporated herein by reference.

TECHNICAL FIELD

The present disclosure relates to a rotary electric machine control device.

BACKGROUND

Conventionally, an electric power steering device configured to detect an abnormality has been known.

SUMMARY

According to an aspect of the present disclosure, a rotary electric machine control device is configured to control drive of a rotary electric machine including a coil of multi-phase.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, examples of the present disclosure will be described.

According to an example of the present disclosure, an electric power steering device is configured to detect an abnormality. As an example, a three-phase brushless motor determines that a current detection circuit causes an abnormality, when an absolute value of a summation of currents flowing simultaneously in a three-phase coils is equal to or more than a set value.

For example, in a configuration where a current detection element is provided on the low potential side of an inverter, a lower arm element needs to be on in all-phase in order to detect the three-phase current simultaneously. However, when an on-time of the lower arm element is short, a detection accuracy becomes low due to an influence of ringing and the like. Therefore, a determination threshold for the abnormality detection has to be increased.

According to an aspect of the present disclosure, a rotary electric machine control device is configured to control drive of a rotary electric machine including a coil of multi-phase.

The rotary electric machine control device comprises an inverter unit including upper arm elements corresponding to phases of the coil and connected to a high potential side and lower arm elements connected to a low potential side of the upper arm element and configured to be turned on and off complementarily with the upper arm elements correspondingly.

The rotary electric machine control device further comprises a current detection unit including current detection elements provided to the phases on the high potential side of the upper arm element or on the low potential side of the lower arm element.

The rotary electric machine control device further comprises a control unit including a current acquisition unit configured to acquire a current detection value from the current detection unit, an energization control unit configured to control energization of the coil based on the current detection value, and an abnormality determination unit configured to perform abnormality determination based on the current detection value.

A detection target element is the upper arm element or the lower arm element, to which the current detection element is provided. A target duty is a duty ratio of the detection target element. The abnormality determination unit is configured to vary a determination threshold, which is used for the abnormality determination based on the current detection value, according to the target duty.

This configuration enables to detect the abnormality appropriately.

Embodiment

Figure 1:
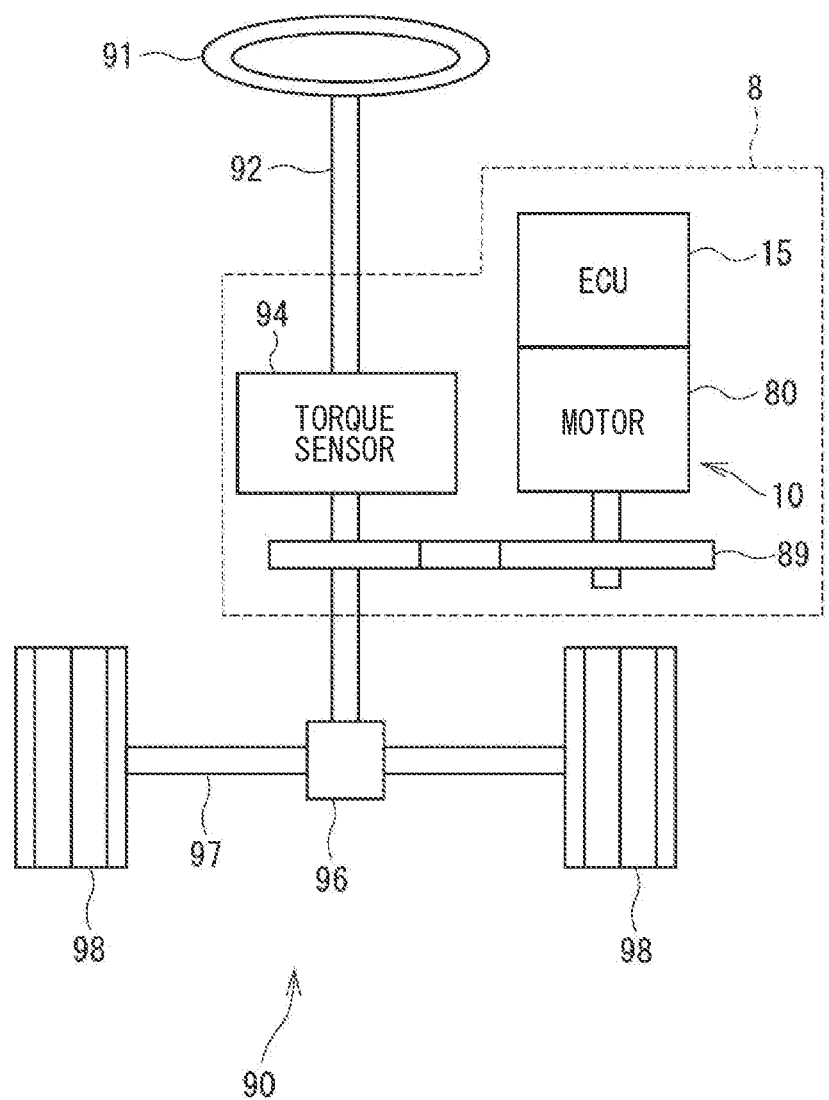
FIG. 1 is a schematic configuration diagram showing a steering system according to an embodiment.

Hereinafter, a rotary electric machine control device according to the present disclosure will be described with reference to the drawings. An embodiment is shown in FIGS. 1 to 9. As shown in FIG. 1, a drive device 10 includes an ECU 15 as a rotary electric machine control device and a motor 80 as a rotary electric machine. The drive device 10 is applied to, for example, an electric power steering apparatus 8 as a steering device for assisting a vehicle steering operation.

FIG. 1 shows a configuration of a steering system 90 including the electric power steering apparatus 8. The steering system 90 includes a steering wheel 91 as a steering member, a steering shaft 92, a pinion gear 96, a rack shaft 97, road wheels 98, the electric power steering apparatus 8, and the like. The steering wheel 91 is connected to the steering shaft 92. A torque sensor 94 is provided at a portion of the steering shaft 92 to detect a steering torque Ts. At the end of the steering shaft 92, the pinion gear 96 is provided. The pinion gear 96 meshes with the rack shaft 97. A pair of road wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted into a linear movement of the rack shaft 97 by the pinion gear 96. The pair of road wheels 98 is steered to an angle corresponding to a displacement amount of the rack shaft 97.

The electric power steering apparatus 8 includes the motor 80, a reduction gear 89, the ECU 15 and the like. The reduction gear 89 is a power transmission mechanism that reduces the rotation of the motor 80 and transmits the reduced rotation to the steering shaft 92. That is, the electric power steering apparatus 8 of the present embodiment is a column assist type, in which the steering shaft 9 is an object to be driven. The electric power steering apparatus 8 may be a rack assist type, in which the rotation of the motor 80 is transmitted to the rack shaft 97.

Figure 2:
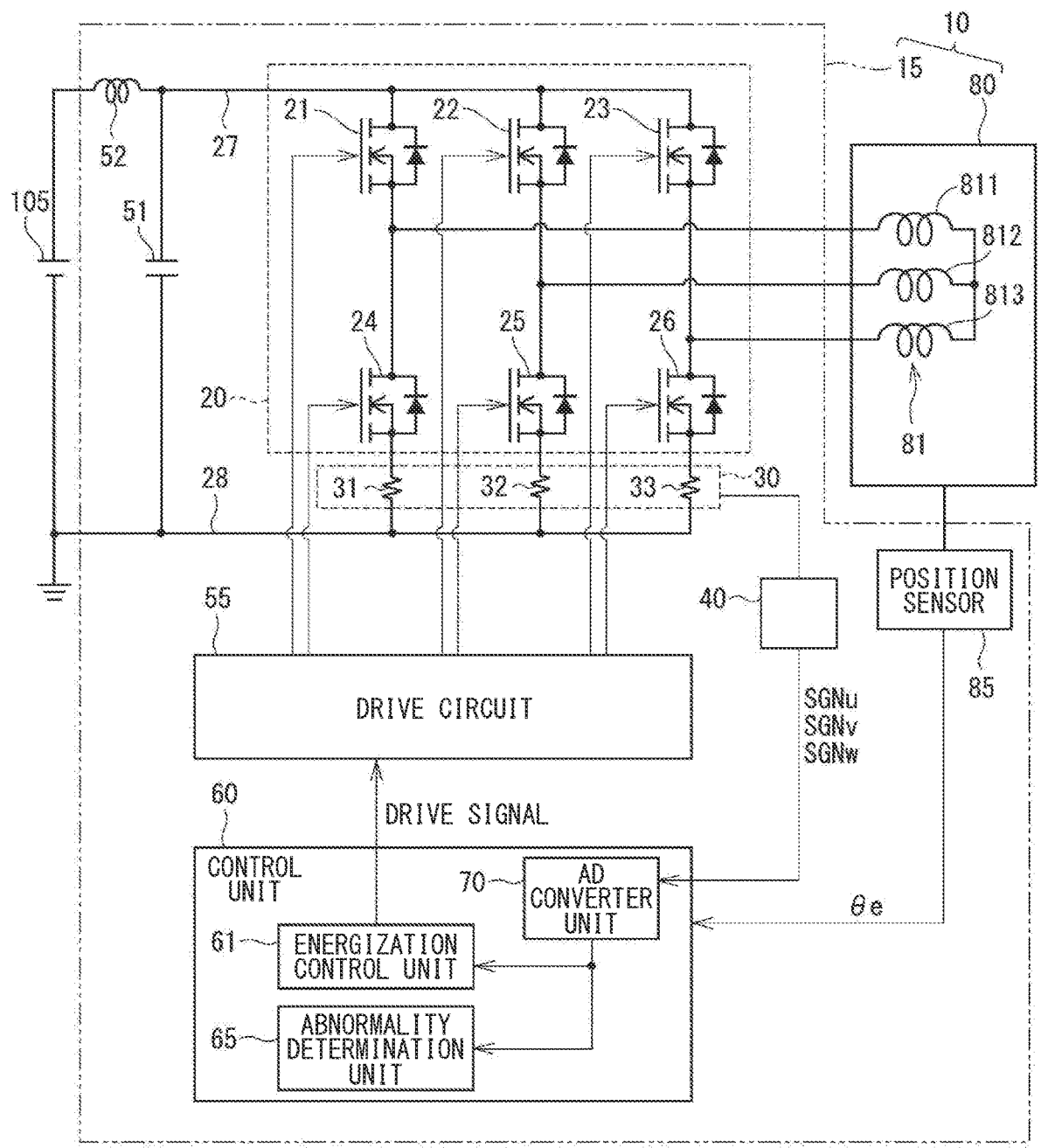
FIG. 2 is a circuit diagram showing a drive device according to the embodiment.

As shown in FIG. 1 to FIG. 2, the motor 80 outputs a whole or a part of a torque required for a steering operation. The motor 80 is driven by electric power supplied from a battery 105 provided as a direct current power supply to rotate the reduction gear 89 in forward and reverse directions. The motor 80 is a three-phase brushless motor, and includes a rotor and a stator, both of which are not shown. As shown in FIG. 2, the position sensor 85 detects an electric angle θe as the rotational position of the motor 80 and outputs the detected value to a control unit 60.

The motor 80 includes a three-phase motor winding 81. The motor winding 81 includes a U-phase coil 811, a V-phase coil 812, and a W-phase coil 813, and is wound around a stator. The ECU 15 controls the drive of the motor 80, and includes an inverter unit (inverter) 20, a current detection unit (current detector) 30, an amplifier circuit unit 40, the control unit 60, and the like.

The inverter unit 20 has six switching elements 21 to 26, and converts electric power supplied to the motor winding 81. Hereinafter, the switching element is referred to as a "switching element". The switching elements 21 to 26 are MOSFETs, but may be IGBTs, thyristors, or the like.

The switching elements 21 to 23 are connected to a high potential side, and the switching element 24 to 26 are connected to a low potential side. Each of the switching elements 21 and 24 that are to be a pair of U-phase elements has a connection point to which one end of the U-phase coil 811 is connected. Each of the switching elements 22 and 25 that are to be a pair of V-phase elements has a connection point to which one end of the V-phase coil 812 is connected. Each of the switching elements 23 and 26 that are to be a pair of W-phase elements has a connection point to which one end of the W-phase coil 813 is connected. The other ends of the respective coils 811 to 813 are connected to each other.

Each of the switching elements 21 to 23 disposed on the high potential side is connected to a cathode of the battery 105 via an upper bus 27. Each of the switching elements 24 to 26 disposed on the low potential side is connected to a ground via a lower bus 28. Hereinafter, the switching elements 21 to 23 connected to the high potential side are each referred to as the "upper-arm element", and the switching elements 24 to 26 disposed on the low potential side are each referred to as the "lower-arm element", as appropriate.

A current detection unit 30 includes a U-phase current detection element 31, a V-phase current detection element 32, and a W-phase current detection element 33, and is provided on a low potential side of the inverter unit 20. Specifically, the U-phase current detection element 31 is provided between the lower-arm element 24 of a U-phase and the lower bus 28, the V-phase current detection element 32 is provided between the lower-arm element 25 of a V-phase and the lower bus 28, and W-phase current detection element 33 is provided between the lower-arm element 26 of a W-phase and the lower bus 28. That is, the current detection elements 31 to 33 are connected in series to the low potential side of the corresponding lower arm elements 24 to 26.

The current detection elements 31 to 33 of the present embodiment are all shunt resistor. Voltage across each of the current detection elements 31 to 33 is output, as the corresponding one of detection values according to phase electric currents Iu, Iv, and Iw, via the amplifier circuit unit 40 to the control unit 60.

A capacitor 51 and a coil 52 are arranged between the battery 105 and the inverter unit 20 to form a filter circuit. By providing the capacitor 51 and the coil 52, a noise transmitted from an external device sharing the battery 105 is reduced, and a noise transmitted from the inverter unit 20 to the external device sharing the battery 105 is reduced.

The capacitor 51 is connected to the upper bus 27 and the lower bus 28 on the side of the inverter unit 20 of the coil 52. By storing electric charges, the capacitor 51 assists in supplying electric power to the inverter unit 20 and suppresses noise components such as a surge current. A power relay (not shown) capable of cutting off the power supply from the battery 105 to the inverter unit 20 is provided between the battery 105 and the filter circuit.

The control unit 60 is mainly composed of a microcomputer and the like, and internally includes, although not shown in the figure, a CPU, a ROM, a RAM, an I/O, a bus line for connecting these components, and the like. Each process executed by the control circuit unit 60 may be a software process or may be a hardware process. The software process may be implemented by causing the CPU to execute a program. The program may be stored beforehand in a memory device such as a ROM, that is, in a computer-readable, non-transitory, tangible storage medium. The hardware process may be implemented by a special purpose electronic circuit.

The control unit 60 includes an energization control unit 61, an abnormality determination unit 65, and an AD converter unit 70. The energization control unit 61 generates a drive signal for controlling an on/off operation of the switching elements 21 to 26 based on the phase currents Iu, Iv, Iw, the electric angle θe, the steering torque Ts, and the like. The generated drive signal is output to gates of the switching elements 21 to 26 via a drive circuit 55. By turning the switching elements 21 to 26 on and off according to the drive signal, the energization of the coils 811 to 813 is controlled. Thereby, the drive of the motor 80 is controlled. The abnormality determination unit 65 performs abnormality determination based on the detection value of the current detection unit 30.

Figure 3:
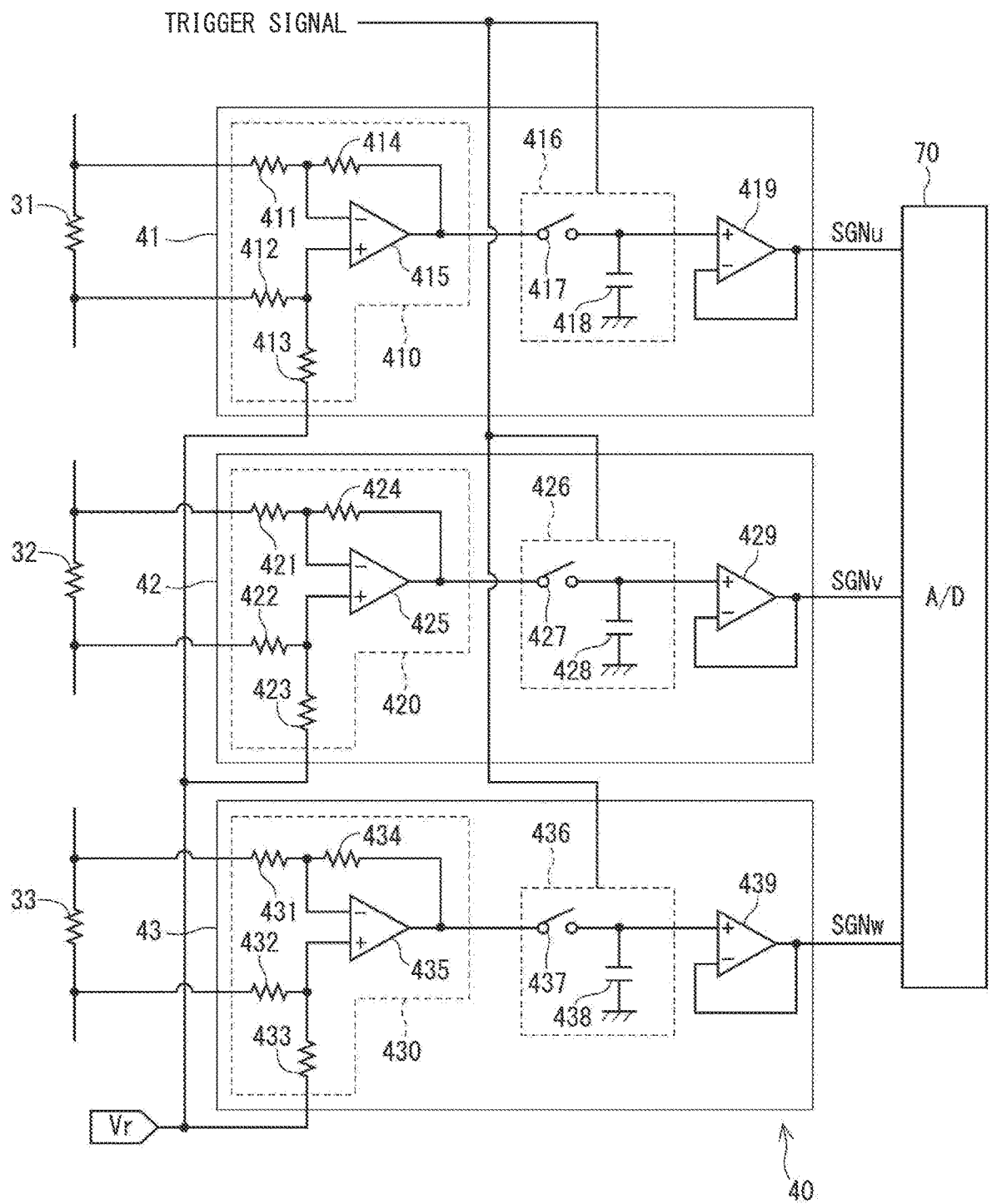
FIG. 3 is a circuit diagram showing an amplifier circuit according to the embodiment.

The amplifier circuit unit 40 is shown in FIG. 3. As shown in FIG. 3, the amplifier circuit unit 40 has a U-phase amplifier circuit unit 41, a V-phase amplifier circuit unit 42, and a W-phase amplifier circuit unit 43, and is provided in, for example, an integrated circuit unit (not shown). The U-phase amplifier circuit unit 41 includes a differential amplifier circuit 410, a sample hold circuit 416, and an operational amplifier 419, and outputs a U-phase current detection signal SGNu according to the voltage across the current detection element 31. The differential amplifier circuit 410 includes resistors 411 to 414 and an operational amplifier 415. The sample and hold circuit 24 includes a switch 24a and a capacitor 24b.

The V-phase amplifier circuit unit 42 includes a differential amplifier circuit 420, a sample hold circuit 426, and an operational amplifier 429, and outputs a V-phase current detection signal SGNv corresponding to the voltage across the current detection element 32. The differential amplifier circuit 420 includes resistors 421 to 424 and an operational amplifier 425. The sample and hold circuit 24 includes the switch 24a and the capacitor 24b.

The W-phase amplifier circuit unit 43 includes a differential amplifier circuit 430, a sample hold circuit 436, and an operational amplifier 439, and outputs a W-phase current detection signal SGNw according to the voltage across the current detection element 33. The differential amplifier circuit 430 includes resistors 431 to 434 and an operational amplifier 435. The sample and hold circuit 436 includes a switch 427 and a capacitor 428. The details of the amplifier circuit units 41, 42, and 43 are similar to each other, and therefore, the U-phase amplifier circuit unit 41 will be mainly described below.

One end of the resistor 411 is connected to the high potential side of the U-phase current detection element 31, and the other end of the resistor 411 is connected to an input terminal of the operational amplifier 415. Resistors 412 and 413 are connected in series, an end on the side of the resistor 412 is connected to a low potential side of the current detection element 31, and an end on the side of the resistor 413 is connected to a reference potential Vr. A midpoint of the resistors 412 and 413 is connected to a + input terminal of the operational amplifier 415. The resistor 414 is provided in a feedback circuit connecting the output side with the input side of the operational amplifier 415.

In the sample hold circuit 416, a voltage of a capacitor 418 is non-inverting amplified by the operational amplifier 419, and the non-inverting amplified signal is output as a U-phase current detection signal SGNu. Similarly, a voltage of the capacitor 428 is non-inverting amplified by the operational amplifier 429, and the non-inverting amplified signal is output as a V-phase current detection value SGNv. Further, a voltage of a capacitor 438 is non-inverting amplified by the operational amplifier 439, and the non-inverting amplified signal is output as a W-phase current detection value SGNw. The current detection signals SGNu, SGNv, and SGNw are all analog signals, and are converted into digital signals by the AD converter unit 70.

In the present embodiment, a U-phase current equivalent value is a reference potential Vr when no current flows. The U-phase current equivalent value is smaller than the reference potential Vr when a current to the ground flows through the current detection element 31, and is larger than the reference potential Vr when a reverse current flows. Therefore, an energization direction can be detected according to a magnitude relationship with the reference potential Vr. Depending on the configuration of the amplifier circuit, the relationship between the magnitude relationship with the detection center and the energization direction may be reversed.

In the following explanation, a value when no current flows through the current detection elements 31 to 33 is 0, a current flowing to the ground is positive, a current flowing from the ground is negative, and current-converted values of the voltages across the current detection elements 31 to 33 are the current detection values Iu_det, Iv_det, and Iw_det. According to a mounting configuration, various determination processes may be performed on a voltage basis, and a determination threshold, the magnitude determination, and the like may be appropriately set according to the definition of the current direction and the like.

Figure 4:
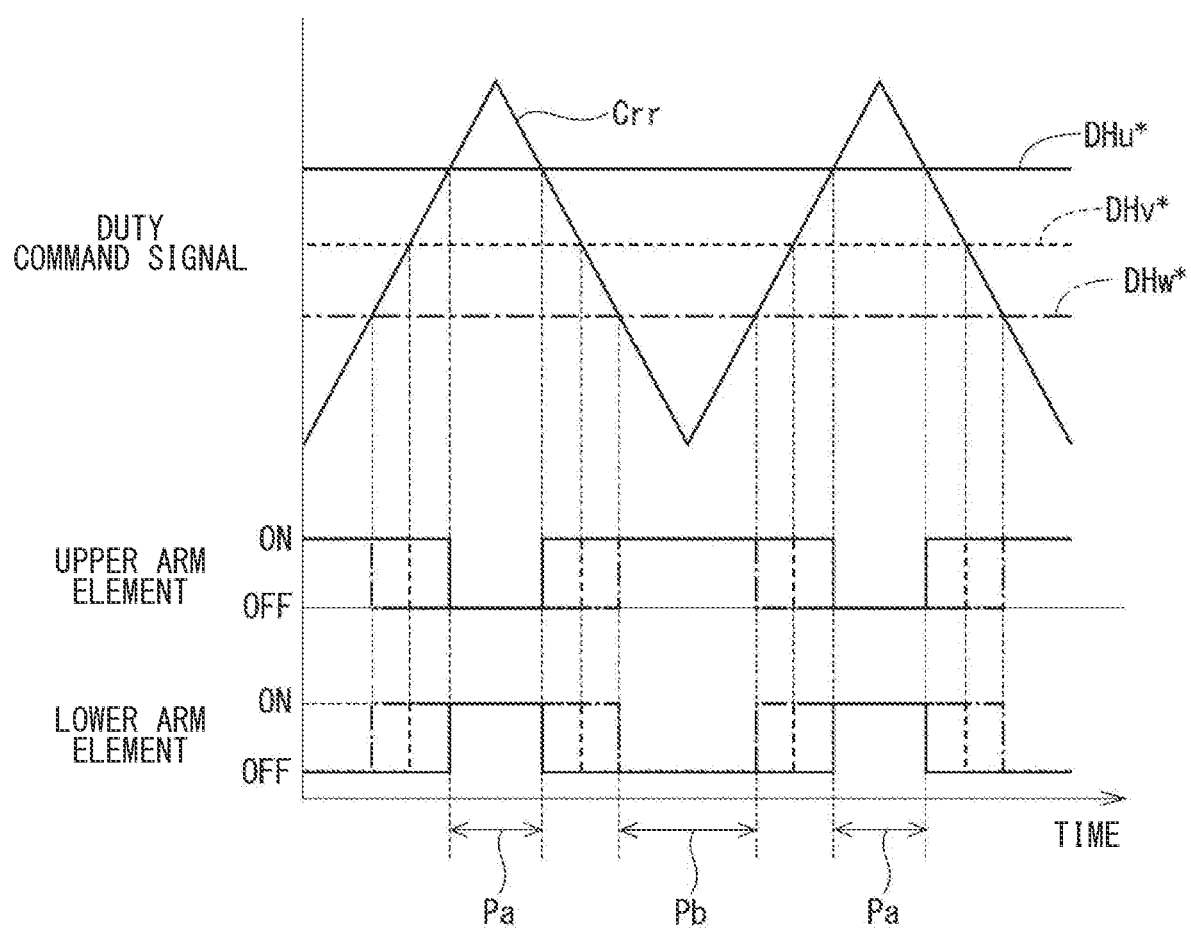
FIG. 4 is a time chart illustrating an on/off control of an upper arm element and a lower arm element according to the embodiment.

As shown in FIG. 4, in the present embodiment, the drive signal is generated by a triangular wave comparison method by comparing the carrier signal Crr of a triangular wave with the duty command value DH* of each phase. For the on/off control of the switching elements 21 to 26, a control method other than the triangular wave comparison method may be used. Here, "duty" as used herein is defined. In the present embodiment, a duty ratio of the upper arm elements 21 to 23 is an upper duty DH, a duty ratio of the lower arm elements 24 to 26 is a lower duty DL, and if necessary, each phase is indicated by an additional letter such as "DHu". Hereinafter, the term "duty" simply means the upper duty DH. The same applies to the duty command value DH*. The switching elements 21 and 24 are turned on and off in a complementary manner, and therefore, in a case where, the upper duty DH is, for example, 90[%], the lower duty DL is 100−90=10[%]. In an actual configuration, it is necessary to secure a dead time, and therefore, the ratio of the on-time is reduced. It is noted that, the dead time is not considered in the present description in order to avoid complication.

The duty command value DH* at the time of three-phase modulation is a sine-wave signal. It is noted that, in FIG. 4, the duty command value DH* is described as constant for the sake of simplification of explanation. In FIG. 4, the U phase is shown by a solid line, the V phase is shown by a broken line, and the W phase is shown by a dashed line. In the present embodiment, when the duty command value DHu* is equal to or higher than the carrier signal Crr, the upper arm element 21 is turned on and the lower arm element 24 is turned off. When the duty command value DHu* is smaller than the carrier signal Crr, the upper arm element 21 is turned off and the lower arm element 24 is turned on. The same applies to the V phase and the W phase.

That is, during a period Pa including the peak of the carrier signal Crr, the lower arm elements 24 to 26 of all phases are turned on. Further, during a period Pb including the valley of the carrier signal Crr, the lower arm elements 24 to 26 of all phases are turned off. In the present embodiment, the current detection elements 31 to 33 are provided on the side of the lower arm elements 24 to 26. Therefore, in the period Pa, it is possible to detect the value in the state where the current flows in the current detection elements 31 to 33 of all the phases. In addition, in the period Pb, it is possible to detect the value in the state where the current does not flow in the current detection elements 31 to 33 of all the phases.

Hereinafter, the period during which all the lower arm elements 24 to 26 are turned on at the upper limit value Dx of the upper duty DH, which will be described later, is referred to as "all-on period". The period during which all the lower arm elements 24 to 26 are turned off at the lower limit value Dy of the upper duty DH, which will be described later, is referred to as "all-off period". Though details will be described later, depending on the duty, some elements may be turned off during the all-on period, and some elements may be turned on during the all-off period. However, for convenience, those periods are referred to as "all-on period" and "all-off period".

Figure 5:
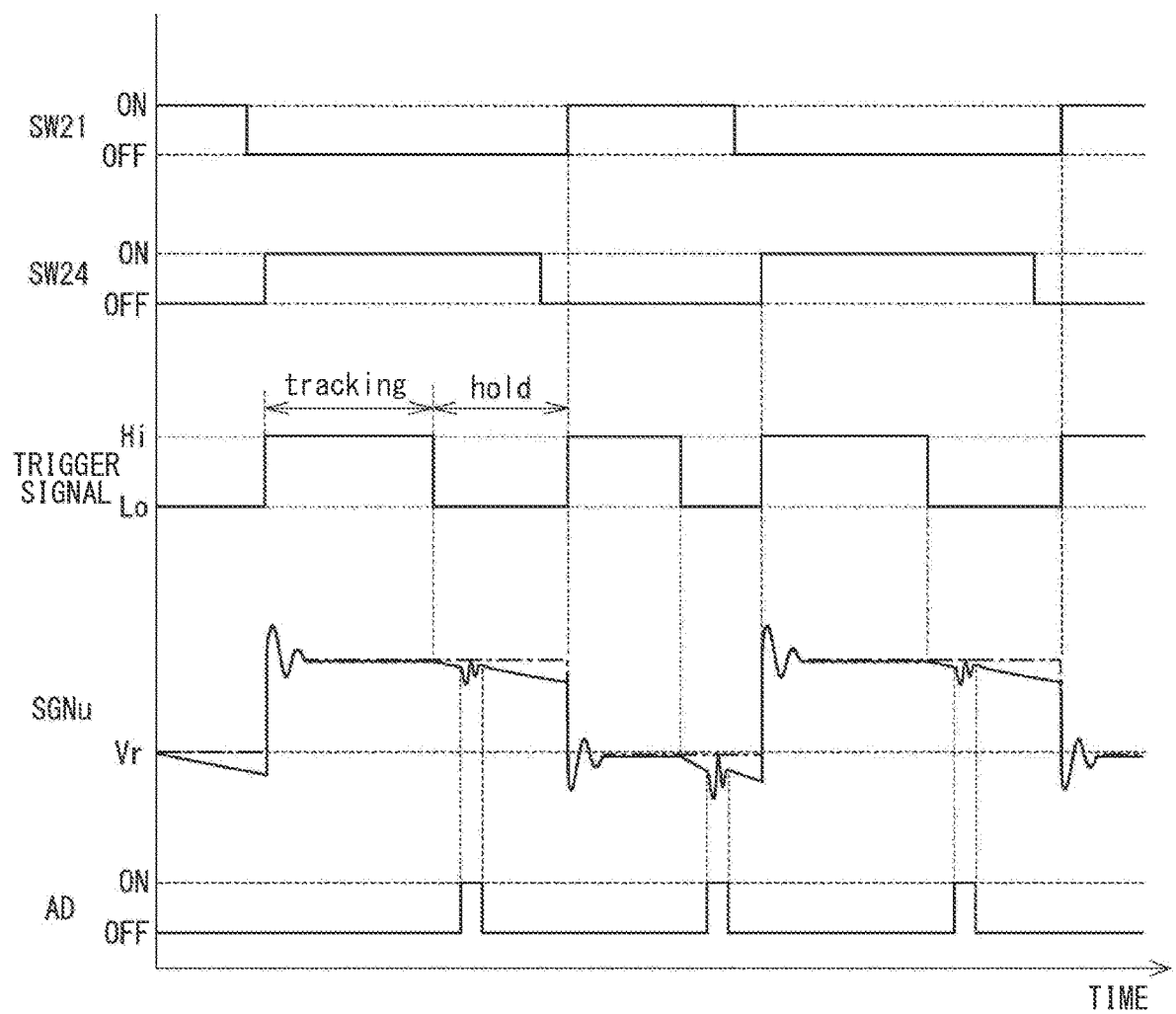
FIG. 5 is a time chart illustrating a sample hold according to the embodiment.

In this embodiment, it is necessary to detect the three-phase currents at the same time. Therefore, sample hold circuits 416, 426, and 436 are provided, and sampling is performed using the same trigger signal output from the control unit 60. FIG. 5 shows, from the upper stage, the on/off state of the upper arm element 21, the on/off state of the lower arm element 24, the trigger signal, the current detection signal SGNu, and the AD conversion timing. An AD conversion timing is an on/off state of the switch of the equivalent circuit provided in the AD converter unit 70 corresponding to each phase. As shown in FIG. 5, when the trigger signal is Hi, a tracking mode is set by turning on a switch 417, and when the trigger signal is Lo, a hold mode is set by turning off the switch 417. In FIG. 5, the current detection signal SGNu with a sample hold is shown by a solid line, and the current detection signal without the sample hold is shown by an alternate long and short dash line. The sample hold circuit 416 is designed so that a voltage drop during the hold is within an acceptable range acceptable as an error.

By switching the trigger signal to Lo during the all-on period, the values detected at the same time for three phases can be held. Further, by turning on/off the switches of each phase of the AD converter unit 70 in the order of the three phases, the held detection value can be AD-converted in the order of the three phases as "values detected at the same time". The same applies to the current detection during the all-off period.

Figure 6:
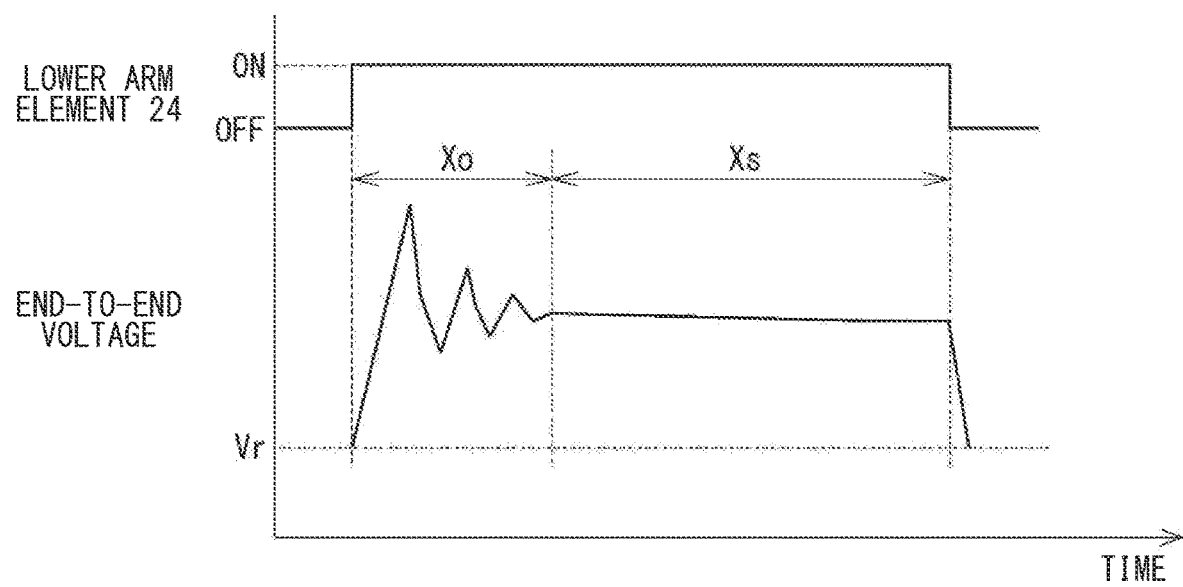
FIG. 6 is a time chart illustrating a voltage across a current detection element according to the embodiment.

As shown in FIG. 6, the voltage across the current detection element 31 causes overshoot and ringing immediately after the lower arm element 24 is turned on, and then converges to a value corresponding to the current value. When the detection is performed in a transient time Xo before the ringing converges, accurate current detection cannot be performed. Therefore, the current is detected in a stable time Xs after the transient time Xo has elapsed. Therefore, in order to perform accurate current detection, it is necessary to secure the on time and the off time of the switching element 24 to be longer than the transient time Xo. The transient time Xo is determined depending on a circuit constant.

Figure 7:
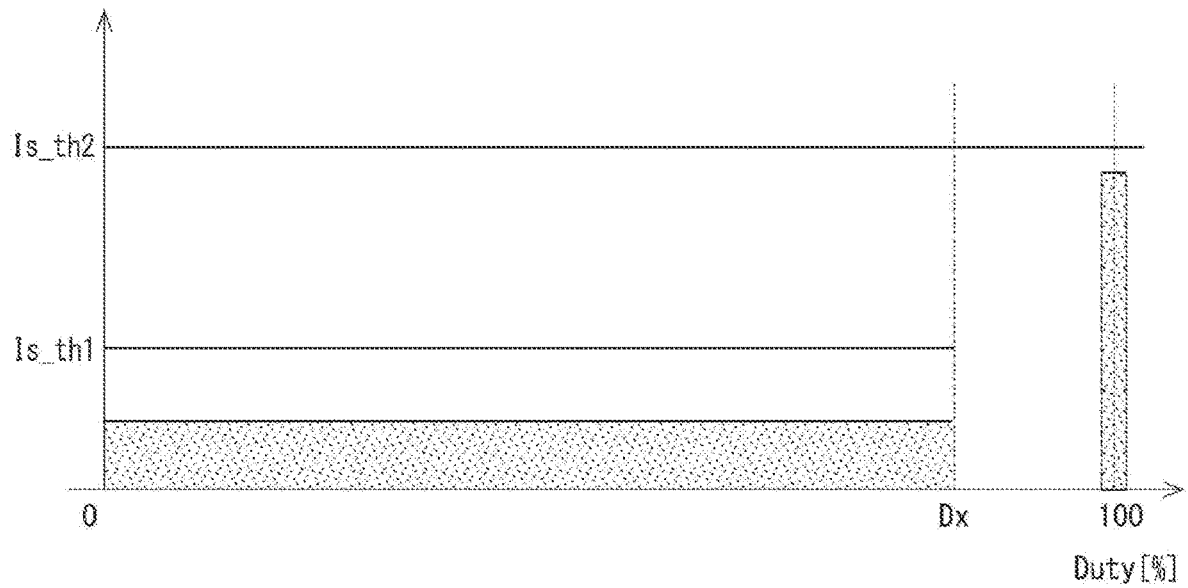
FIG. 7 is an explanatory diagram showing an overcurrent determination threshold according to the embodiment.
Figure 8:
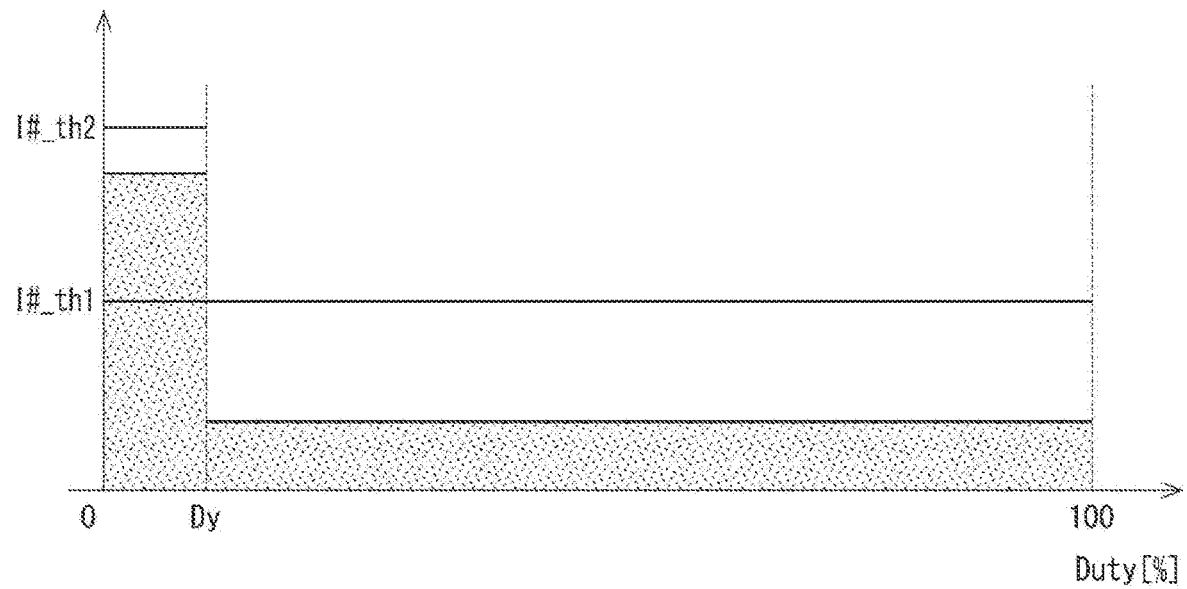
FIG. 8 is an explanatory diagram showing a short-circuit determination threshold according to the embodiment.

In the present embodiment, current detection is performed for the three-phase simultaneously with all lower arm elements 24 to 26 turned on. Therefore, as shown in FIG. 7, in order to secure the on-time of the lower arm elements 24 to 26, a duty range which is equal to or less than a duty upper limit value Dx (for example, 90[%]) is used for the control. The duty range which is larger than the duty upper limit value Dx and less than 100% is not be used for the control. It is noted that, in order to secure the output, the 100% duty is used for the control. In FIGS. 7 and 8, the range of current values that can be taken under a normal condition is shown by hatching.

The 100% duty includes a case where an overmodulation process, in which the amplitude of the three-phase duty command value DH* is larger than the carrier signal Crr, is performed, a case where a two-phase modulation process, which shifts the neutral point voltage while maintaining the line voltage by adding or subtracting the same value to the three phases such that the largest value of duty becomes 100%, and the like.

In a range where the upper duty DH is the duty upper limit value Dx or less, the summation of the phase currents Iu, Iv, and Iw (hereinafter, "three-phase summation") becomes 0 according to Kirchhoff's law. On the other hand, when the upper duty DH is 100%, any of the lower arm elements 24 to 26 is turned off. Therefore, accurate current detection cannot be performed simultaneously for the three phases, and even when it is normal, the condition of the three-phase summation=0 is not satisfied.

Therefore, when an overcurrent abnormality is detected with one determination threshold, it is necessary to set the threshold in consideration of a worst condition in which the condition of the three-phase summation=0 is not satisfied at the 100% duty. By the way, in a case where the power supply circuit is provided redundantly, for example, for autonomous operation, a wiring resistance per system may increase due to parallelization of the circuits. In addition, due to increasing safety requirements, it is required to continue operation in a wider voltage range. An increase in the wiring resistance leads to a decrease in the current generated at the time of failure. On the other hand, enlargement of the operating voltage range leads to an increase in the current value that can be taken in the normal state. Therefore, in a case where the threshold for the abnormality determination cannot be set appropriately, there is a possibility that appropriate failure detection cannot be performed.

Therefore, in the present embodiment, the overcurrent determination threshold Is_th is switched according to the on-time of the lower arm elements 24 to 26. Specifically, when the duty command value DH* is the duty upper limit value Dx or less, a first overcurrent determination threshold Is_th1 is used, and when the duty command value DH* is 100%, a second overcurrent determination threshold Is_th2 is used. The first overcurrent determination threshold Is_th1 is set to a value such that the condition of the three-phase summation=0 is regarded to be satisfied in consideration of a detection error and the like. The second overcurrent determination threshold Is_th2 is set to a value larger than the first overcurrent determination threshold Is_th1 on the premise that the condition of the three-phase summation=0 is not satisfied. That is, Is_th1<Is_th2. The duty command value DH* is larger than the duty upper limit value Dx, and the on-time of the lower arm elements 24 to 26 is short. Therefore, since a through current does not flow, and a large current is not generated in the first place. Thus, the overcurrent determination threshold Is_th may be set to a relatively large value.

Further, in the present embodiment, the current is detected not only in the all-on period but also in the all-off period, and is used for offset correction and the like. When the lower arm elements 24 to 26 are turned off, the current becomes 0 under the normal state. Here, when a current flowing vertically from the upper bus 27 to the lower bus 28 therethrough, for example, due to a short circuit failure of the lower arm element 24, the current in the all-on period and the current in the all-off period are both non-zero values.

In this embodiment, an arm short-circuit abnormality detection is performed based on each phase current detection value. As shown in FIG. 8, in the range where the duty command value DH* is the duty lower limit value Dy or more, the phase currents Iu, Iv, and Iw during the all-off period are substantially 0. On the other hand, when the duty command value DH* is smaller than the duty lower limit value Dy (for example, 10[%]), accurate current detection cannot be performed due to an influence of ringing or the like.

Therefore, in the present embodiment, the arm short-circuit determination threshold is switched according to the on-time of the lower arm elements 24 to 26. For example, in a case of the U phase, when the duty command value DH* is the duty lower limit value Dy or more, the first short circuit determination threshold Iu_th1 is used. When the duty command value DH* is smaller than the duty lower limit value Dy, the second short circuit determination threshold Iu_th2 is used. The second short-circuit determination threshold Iu_th2 is set to a value larger than the first short-circuit determination threshold Iu_th1 in consideration of the influence of ringing and the like. That is, Is_th1<Is_th2.

In FIG. 8 and the like, the symbol "#" means u, v, and w representing the phases. Here, the current acquired during the all-on period may exceed the first short-circuit determination threshold Iu_th1, in the region where the duty command value DH* is larger than the duty lower limit value Dy, even in the normal state. Further, for example, in a case where the offset correction is invalidated or where a value when the duty command value DH* is larger than the duty lower limit value Dy is used for the offset correction, a range in which the duty command value DH* is smaller than the lower limit value Dy may be used for the control.

Further, when the overcurrent abnormality or the arm short-circuit abnormality is detected, the duty command value DH* is limited to the duty lower limit value Dy or more and is limited to the duty upper limit value Dx or less. In addition, the overmodulation, the neutral point voltage operation, and the like are stopped, and a duty limitation is implemented to return to the three-phase modulation. When the abnormal condition continues even after the duty is limited, the abnormality is confirmed.

Here, when the arm short-circuit abnormality occurs, generally, a current is generated from the power supply side to the ground side. On the other hand, the current caused by a counter electromotive force generated by turning the motor 80 due to a reverse input from an external device is in the opposite direction. For example, in a case of a collision with a curb or the like, or in a case where the steering wheel 91 is turned at a high speed during a control stop in, for example, initial check, and the like, there is a concern that a large current equivalent to a failure would occur due to the counter electromotive force. Therefore, in order to prevent erroneous determination, when the current direction flowing through the current detection elements 31 to 33 is from the side of the ground to the side of the power supply, the overcurrent determination and the arm short circuit determination are canceled, or a difference threshold is set.

Figure 9:
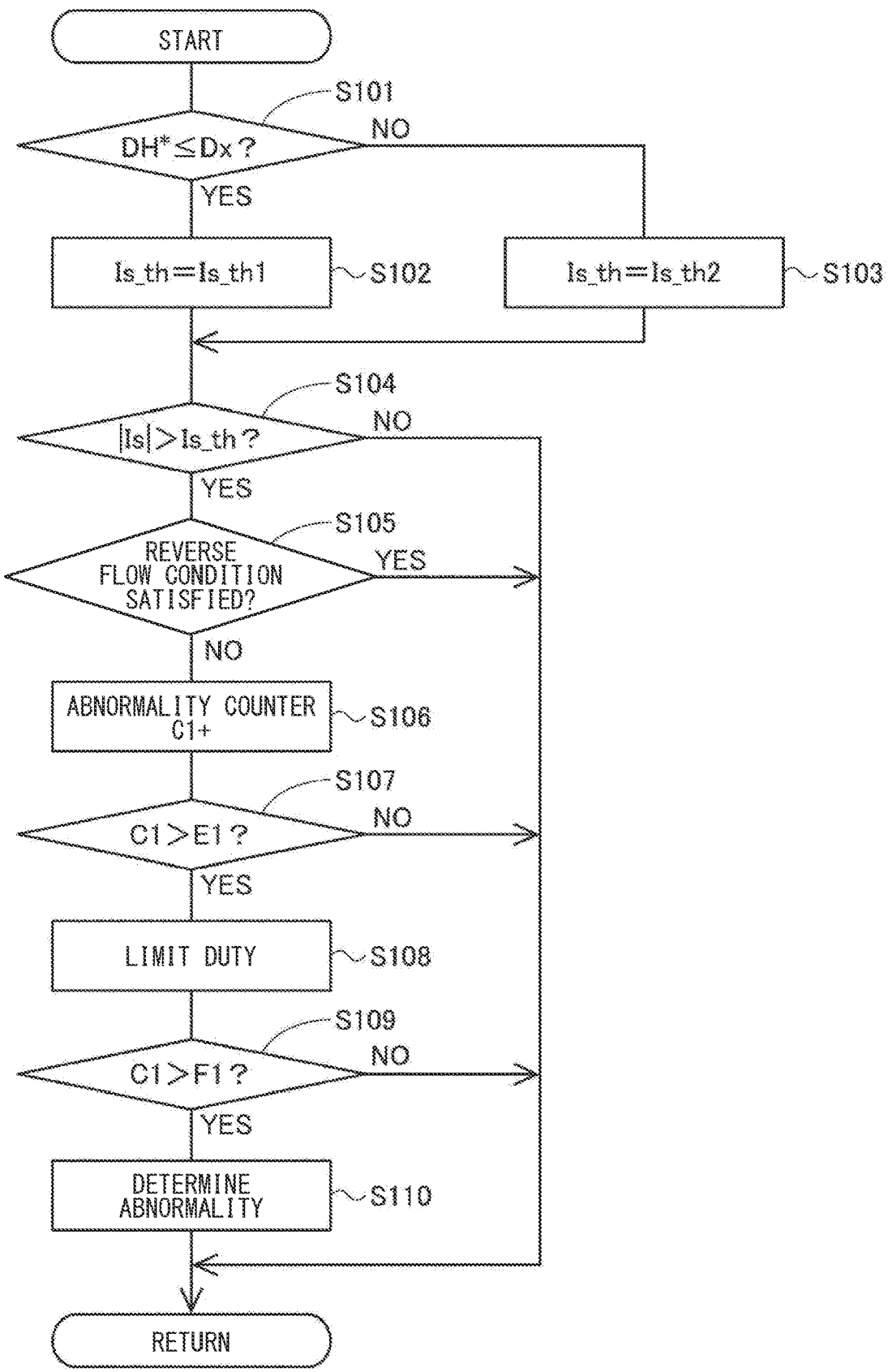
FIG. 9 is a flowchart showing overcurrent processing according to the embodiment.

The overcurrent determination process of this embodiment will be described with reference to the flowchart of FIG. 9. This process is mainly executed by the abnormality determination unit 65 of the control unit 60 at a predetermined cycle. However, a part of the process may be executed by another unit than the abnormality determination unit 65. The computation cycle of the overcurrent determination process may be different from the current detection cycle. For example, when the computation cycle of the overcurrent determination process is longer than the current detection cycle, the latest current detection value may be used, or an average value of a plurality of current detection values may be used. The same applies to the short-circuit determination process described later. Hereinafter, "step" in step S101 is omitted, and is simply shown by a symbol "S". The same applies to the other steps.

In S101, the abnormality determination unit 65 determines whether or not the duty command value DH* is equal to or less than the duty upper limit value Dx. When it is determined that the duty command value DH* is equal to or less than the duty upper limit value Dx (S101: YES), the process proceeds to S102, and the overcurrent determination threshold Is_th is set to the first overcurrent determination threshold Is_th1. When it is determined that the duty command value DH* is larger than the duty upper limit value Dx (S101: NO), the process proceeds to S103, and the overcurrent determination threshold Is_th is set to the second overcurrent determination threshold Is_th2.

In S104, the abnormality determination unit 65 determines whether or not an absolute value of the three-phase summation determination value Is is larger than the overcurrent determination threshold Is_th. The three-phase summation determination value Is is shown by an equation (1). When the voltage values before the current conversion are used as the current detection values Iu_det, Iv_det, and Iw_det, a value corresponding to a detection center value corresponding to the current value that is 0 is corrected and used. When it is determined that the absolute value of the three-phase summation determination value Is is equal to or less than the overcurrent determination threshold Is_th (S104: NO), a normal determination is made, the process after S105 is not performed, and this routine is terminated. When it is determined that the absolute value of the three-phase summation determination value Is is larger than the overcurrent determination threshold Is_th (S104: YES), it is determined that the overcurrent abnormality arises, and the process proceeds to S105.

$$Is=Iu\_det+Iv\_det+Iw\_det \quad (1)$$

In S105, the abnormality determination unit 65 determines whether or not the reverse flow condition is satisfied. Here, when the current detection value Iu_det is smaller than the reverse flow determination threshold Ir_th, which is set to a negative value, it is determined that it is in the reverse flow state. In this embodiment, the current value in the reverse flow direction is set to a negative value. Therefore, when the current detection value Iu_det is smaller than the reverse flow determination threshold Ir_th, the current detection value Iu_det, as an absolute value, is larger than the reverse flow determination threshold Ir_th. Thus, it is regarded that the reverse flow current is larger than the reverse flow determination threshold. The same applies to the V phase and the W phase. In this step, when at least one of the current detection values Iu_det, Iv_det, and Iw_det in the all-on period and the all-off period of all the phases is determined to be in the reverse flow state, a positive judgment is made. When it is determined that the reverse flow condition is satisfied (S105: YES), the process after S106 is not performed, and this routine is terminated. This process corresponds to a cancel process of the overcurrent abnormality determination. When it is determined that the reverse flow condition is not satisfied (S105: NO), the process proceeds to S106, and an overcurrent counter C1 is incremented.

In S107, the abnormality determination unit 65 determines whether or not the overcurrent counter C1 is larger than a duty limit determination value E1. The duty limit determination value E1 is set to a time period from the detection of the overcurrent abnormality to the start of the duty limit. When the duty limit determination value E1 is set to 1, the duty limit is immediately executed after the overcurrent abnormality is detected. The same applies to a duty limit determination value E2 described later. When it is determined that the overcurrent counter C1 is equal to or less than the duty limit determination value E1 (S107: NO), the process after S108 is not performed, and this routine is terminated. When it is determined that the overcurrent counter C1 is larger than the duty limit determination value E1 (S107: YES), the process proceeds to S108, the upper and lower limits of the duty command value DH* are limited, and the modulation is returned to the three-phase modulation. When the three-phase modulation is in progress, the three-phase modulation is continued.

In S109, the abnormality determination unit 65 determines whether or not the overcurrent counter C1 is larger than the abnormality confirmation determination value F1. The abnormality confirmation determination value F1 is set according to the time period from the detection of the overcurrent abnormality to the confirmation of the abnormality. The same applies to the abnormality confirmation determination value F2 described later. When it is determined that the overcurrent counter C1 is equal to or less than the abnormality confirmation determination value F1 (S109: NO), the process of S110 is not performed, and this routine is terminated. When it is determined that the overcurrent counter C1 is larger than the abnormality confirmation determination value F1 (S109: YES), the process proceeds to S110, the overcurrent abnormality is confirmed, and the drive control of the motor 80 is stopped. In a case where a combination of the motor winding 81 and the inverter unit 20 is used as a system and where the system is composed of a plurality of systems, the system that has caused the overcurrent abnormality may be stopped, and the motor 80 may be continuously driven by a normal system. The same applies to the short-circuit abnormality.

Figure 10:
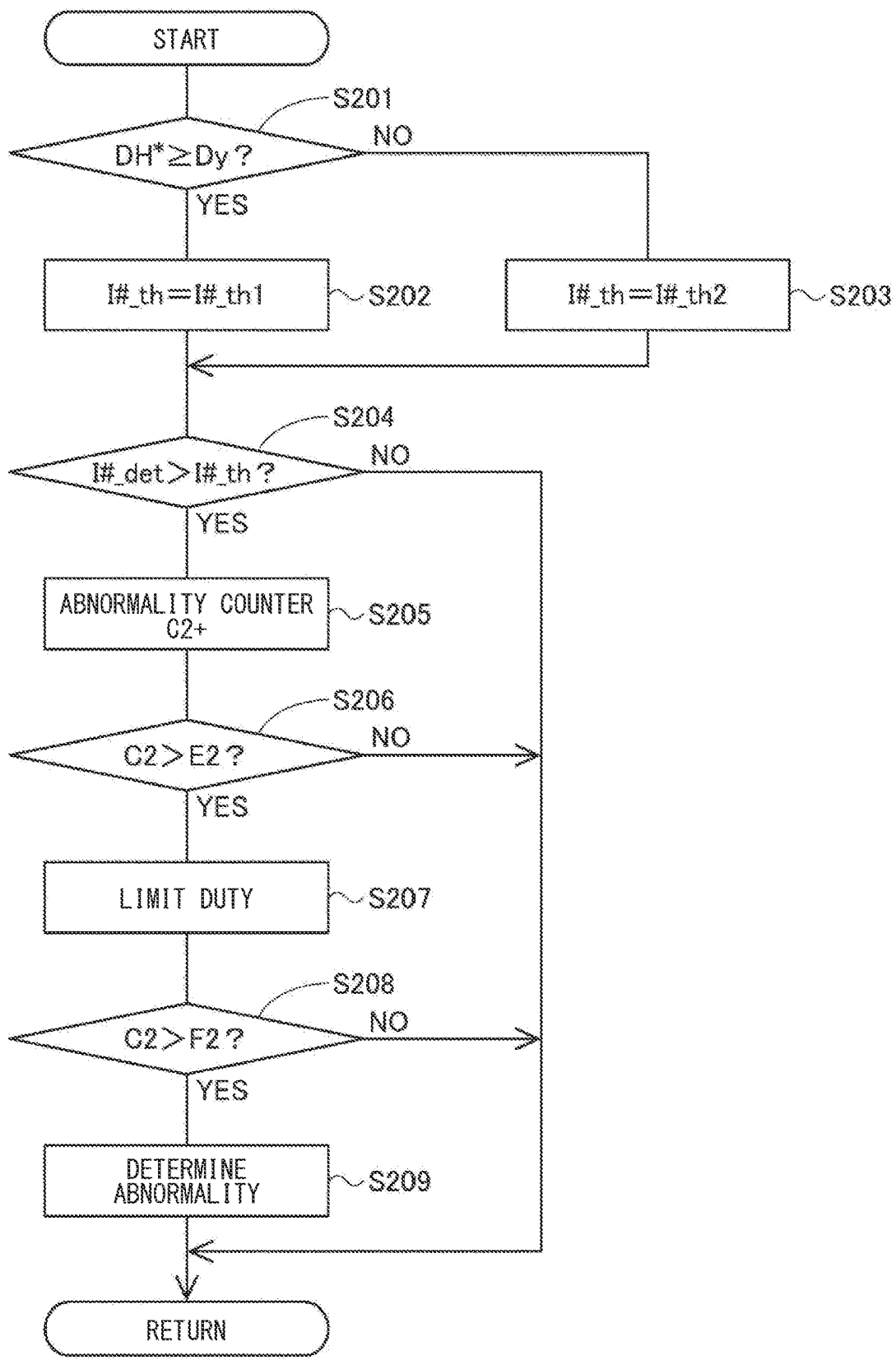
FIG. 10 is a flowchart showing short-circuit determination processing according to the embodiment.

The short circuit determination process will be described with reference to the flowchart of FIG. 10. It is assumed that this process is executed for each of the phases, and herein, the U phase will be described as an example. In S201, the abnormality determination unit 65 determines whether or not the duty command value DH* is equal to or larger than the duty lower limit value Dy. When it is determined that the duty command value DH* is equal to or larger than the duty lower limit value Dy (S201: YES), the process proceeds to S202, and the short circuit determination threshold Iu_th is set to the first short circuit determination threshold Iu_th1. When it is determined that the duty command value DH* is smaller than the duty lower limit value Dy (S201: NO), the process proceeds to S203, and the short circuit determination threshold Iu_th is set to the second short circuit determination threshold Iu_th2.

In S204, the abnormality determination unit 65 determines whether or not the U-phase current detection value Iu_det in both the all-off period and the all-on period is larger than the short-circuit determination threshold Iu_th. When the current flow through the upper and the lower due to the arm short circuit, the current flows during both the all-off period and the all-on period. When it is determined that the U-phase current detection value Iu_det in the all-off period or the all-on period is equal to or less than the short-circuit determination threshold Iu_th (S204: NO), the process after S205 is not performed, and this routine is terminated. When it is determined that the U-phase current detection value Iu_det in both the all-off period and the all-on period is larger than the short-circuit determination threshold Iu_th (S204: YES), it is determined that the short circuit abnormality occurs in the U-phase arm, and the process proceeds to S205, in which a short-circuit abnormality counter C2 is incremented. The short-circuit determination threshold Iu_th is set to a positive value. Therefore, there is no reverse flow of a current in the U phase when the positive determination is made in S204.

In S206, the abnormality determination unit 65 determines whether or not the short-circuit abnormality counter C2 is larger than the duty limit determination value E2. When it is determined that the short-circuit abnormality counter C2 is equal to or less than the duty limit determination value E2 (S206: NO), the process after S206 is not performed, and this routine is terminated. When it is determined that the short-circuit abnormality counter C2 is larger than the duty limit determination value E2 (S206: YES), the process proceeds to S207, in which the upper and lower limits of the duty command value DH* are limited, and returns to the three-phase modulation. When the three-phase modulation is in progress, the three-phase modulation is continued.

In S208, the abnormality determination unit 65 determines whether or not the short-circuit abnormality counter C2 is larger than the abnormality confirmation determination value F2. When it is determined that the short-circuit abnormality counter C2 is equal to or less than the abnormality confirmation determination value F2 (S208: NO), the process of S209 is not performed, and this routine is terminated. When it is determined that the short-circuit abnormality counter C2 is larger than the abnormality confirmation determination value F2 (S208: YES), the process proceeds to S209, in which the U-phase arm short-circuit abnormality is confirmed, and the drive control of the motor 80 is stopped.

In the present embodiment, the overcurrent determination threshold Is_th and the short-circuit determination threshold I#_th are variable according to the on time of the lower arm elements 24 to 26. When the lower arm elements 24 to 26 are turned on for a long time, the current detection accuracy in the all-on state is high. Therefore, by setting the overcurrent determination threshold Is_th to a relatively small value, the overcurrent detection can be performed with high accuracy. Further, even when the on time is short, erroneous determination can be restricted by setting the overcurrent determination threshold Is_th to a relatively large value.

When the lower arm elements 24 to 26 are turned off for a long time, the current detection accuracy is high in the all-off state. Therefore, by setting the short circuit determination threshold I#_th to a relatively small value, the short circuit detection can be performed with high accuracy. Further, even when the off time is short, erroneous determination can be restricted by setting the short-circuit determination threshold I#_th to a relatively large value. Further, when an abnormality is detected, by limiting the upper and lower limits of the duty and by continuing the detection by three-phase modulation, it is possible to appropriately distinguish between a temporary abnormality and a non-temporary abnormality.

As described above, the ECU 15 controls the drive of the motor 80 including the multi-phase coils 811 to 813, and includes the inverter unit 20, the current detection unit 30, and the control unit 60. The inverter unit 20 includes the upper arm elements 21 to 23 corresponding to the phases of the coil 811 to 813 and connected to the high potential side, and the lower arm elements 24 to 26 connected to the low potential side of the upper arm elements 21 to 23 and turned on and off complementarily with the corresponding upper arm elements 21 to 23.

The current detection unit 30 includes the current detection elements 31 to 33 provided for the phases on the high potential side of the upper arm elements 21 to 23 or on the low potential side of the lower arm elements 24 to 26. Here, the upper arm elements 21 to 23 or the lower arm elements 24 to 26 on the side where the current detection elements 31 to 33 are provided are detection target elements. In the present embodiment, the current detection elements 31 to 33 are provided on the low potential side of the lower arm elements 24 to 26, and therefore, the lower arm elements 24 to 26 are the detection target elements. Further, the duty ratio of the lower arm elements 24 to 26 is a target duty.

The control unit 60 includes the AD converter unit 70, the energization control unit 61, and the abnormality determination unit 65. The AD converter unit 70 acquires the current detection values Iu_det, Iv_det, and Iw_det from the current detection unit 30. In the present embodiment, the AD converter unit 70 acquires the detected value via the amplifier circuit unit 40. The energization control unit 61 controls energization of the coils 811 to 813 based on the current detection values Iu_det, Iv_det, and Iw_det. The abnormality determination unit 65 performs the abnormality determination based on the current detection values Iu_det, Iv_det, and Iw_det.

The abnormality determination unit 65 varies the determination threshold used for abnormality determination based on the current detection values Iu_det, Iv_det, and Iw_det according to the target duty. Thereby, the abnormality determination can be appropriately performed.

In a case where the abnormality determination unit 65 performs the abnormality determination based on the all phase summation at an all-on appearance timing, in which the lower arm elements 24 to 26 of all phases are turned on, the determination threshold, when the target duty is equal to or larger than an all-on threshold switching duty, is a value corresponding to a smaller current than when the target duty is smaller than the all-on threshold switching duty. In this embodiment, it means that Is_th1<Is_th2. This configuration enables to appropriately detect the overcurrent abnormality.

When an abnormality is detected by the abnormality determination based on the summation of currents of all phases, the energization control unit 61 sets the target duty to the threshold switching duty or more and limits the energization of the coils 811 to 813 by the three-phase modulation. In this way, in a case where an abnormality is detected once, the target duty is set to be equal to or higher than the all-on-threshold switching duty. In addition, the determination threshold corresponding to the small current (that is, the first overcurrent determination threshold Is_th1) is continually set. In this way, the detection of the abnormality can be continued appropriately. Further, by using three-phase modulation, it is possible to reduce an influence of voltage distortion and the like as compared with a case of using, for example, the two-phase modulation.

When the abnormality determination unit 65 performs the abnormality determination based on the current detection values Iu_det, Iv_det, and Iw_det of the phases at an all-off appearance timing, in which the detection target elements of all phases are turned off, the determination threshold when the target duty is equal to or less than the all-off threshold switching duty is a value corresponding to a smaller current than when the target duty is larger than the all-off threshold switching duty. In this embodiment, it means that I #_th1<I #_th2. This configuration enables to appropriately detect the short circuit abnormality.

When an abnormality is detected by the abnormality determination based on the current detection values Iu_det, Iv_det, and Iw_det of the phases at the all-off appearance timing, the energization control unit 61 sets the target duty to be equal to or less than the all-off threshold switching duty, and limits the energization of the coils 811 to 813 by the three-phase modulation. In this way, in a case where an abnormality is detected once, the target duty is set to be equal to or less than the all-off-threshold switching duty. In addition, the determination threshold corresponding to the small current (that is, the first short circuit determination threshold I #_th1) is continually set. In this way, the detection of the abnormality can be continued appropriately. Further, by using three-phase modulation, it is possible to reduce an influence of voltage distortion and the like as compared with a case of using, for example, the two-phase modulation.

When the reverse flow current from the side of the ground to the side of the power supply of the current detection elements 31 to 33 is detected (S105: YES), the abnormality determination unit 65 cancels the abnormality determination. In this way, the configuration enables to restrict erroneous determination due to the current generated by the counter electromotive force caused by the motor 80 being rotated by the reverse input from an external device.

The current detection elements 31 to 33 of the present embodiment are shunt resistor. The ECU 15 further includes the amplifier circuit unit 40. The amplifier circuit unit 40 includes the differential amplifier circuits 410, 420, 430 that amplify the voltage across the current detection elements 31 to 33, and the sample hold circuits 416, 426, and 436. The sample hold circuits 416, 426, and 436 performs sample hold of the outputs of the differential amplifier circuits 410, 420, and 430 at every ½ cycle of the on/off cycle of the lower arm elements 24 to 26. In the present embodiment, the current detection signals SGNu, SGNv, and SGNw are sampled at every ½ cycle of the on/off cycle. That is, the current detection is performed during the all-on period near the peak of the carrier signal Crr and the all-off period near the valley of the carrier signal Crr. In this way, the detection is performed when the all phases of the lower arm elements 24 to 26 are turned on and when the all phases of the lower arm elements 24 to 26 are turned off. Thus, the abnormality determination based on the current detection values Iu_det, Iv_det, and Iw_det can be appropriately performed.

In this embodiment, the ECU 15 corresponds to a "rotary electric machine control device", and the AD converter unit 70 corresponds to a "current acquisition unit". The current detection unit 30 is provided on the low potential side, and the lower arm elements 24 to 26 correspond to a "detection target element". Therefore, the lower duty DL corresponds to the "target duty". Further, the overcurrent determination threshold and the short circuit determination threshold correspond to a "determination threshold". The cycle of the carrier signal Crr corresponds to a "on/off cycle of the detection target element".

The "all-on period" corresponds to the "all-on appearance timing". In a case where the duty is 100%, in a case of the two-phase modulation, or the like, the lower arm elements 24 to 26 of all phases need not be necessarily turned on. Further, the duty upper limit value Dx corresponds to an "all-on threshold switching duty". The case where the duty command value DH* is equal to or less than the duty upper limit value Dx (S101: YES) corresponds to a case where "the target duty is equal to or more than all-on threshold switching duty". The case where the duty command value DH* is larger than the duty upper limit value Dx (S101: NO) corresponds to "a case where the target duty is smaller than the all-on threshold switching duty".

The "all-off period" corresponds to the "all-off appearance timing". It should be noted that the lower arm elements 24 to 26 of the all phases are not necessarily turned off in, for example, two-phase modulation. Further, the duty upper limit value Dx corresponds to an "all-on threshold switching duty". The case where the duty command value DH* is equal to or larger than the lower limit value Dy (S201: YES) corresponds to a case where "the target duty is equal to or less than the all-off threshold switching duty". The case where the duty command value DH* is smaller than the lower limit value Dy (S201: NO) corresponds to a case where "the target duty is larger than the all-off threshold switching duty". Further, the threshold switching duty may include a plurality of threshold switching duties, and the determination threshold may be switched stepwise. In S204, the determination is made using the values of the all-on period and the all-off period, however, the determination based on the values of the all-on period may be omitted.

The "value corresponding to the small current" means that the first overcurrent determination threshold Is_th1 is smaller than the second overcurrent determination threshold Is_th2, that is, Is_th1<Is_th2. Further, it means that the first short-circuit determination threshold I #_th1 is smaller than the second overcurrent determination threshold Is_th2, that is, I #_th1<I #_th2. In addition, for example, in a case where the threshold comparison is performed based on the voltage value before the current conversion and where the voltage value is designed to decrease as the current increases, it is appropriately set according to the correspondence between the value used for the determination and the current value, such that the value when the target duty is equal to or larger than the threshold switching duty becomes larger than when the target duty is smaller than the threshold switching duty.

Other Embodiments

In the above embodiment, the current detection element is provided on the low potential side of the lower arm element. In another embodiment, the current detection element may be provided on the high potential side of the upper arm element. In this case, the upper arm element corresponds to the "detection target element" and the upper duty corresponds to the "target duty". When the current detection element is on the high potential side, the "all-off appearance timing" is on the valley side of the carrier wave, and the "all-on appearance timing" is on the peak side of the carrier wave. Further, in the above embodiment, the current detection element is the shunt resistor. In another embodiment, the current detection element may be a Hall IC or the like other than the shunt resistor.

In the above embodiment, it is determined whether or not the reverse flow condition is satisfied based on the current detection value. In another embodiment, the reverse flow determination may be performed based on the rotation speed of the motor. That is, when the motor rotation speed is larger than the reverse flow determination value, the abnormality determination may be masked.

In the above embodiments, one motor winding, one inverter circuit and one control circuit are provided. In another embodiment, two or more of the motor windings, two or more the inverter units, and/or two or more the control units may be provided. Further, for example, one control circuit may be provided for a plurality of motor windings and a plurality of inverter circuits. A plurality of inverter circuits and a plurality of motor windings may be provided for one control circuit. That is, the numbers of the motor windings, inverter circuits and control circuits may be different.

In the above embodiment, the amplifier circuit unit is provided in the integrated circuit unit. In another embodiment, for example, the differential amplifier circuit may be provided in the integrated circuit unit, and the sample hold circuit may be provided inside the microcomputer constituting the control unit. Further, the sample hold circuit may be provided separately from the integrated circuit unit and the control unit.

In the above embodiments, the rotary electric machine is the three-phase brushless motor. In another embodiment, the rotary electric machine is not limited to the brushless motor, and may have four or more phases. Further, the rotary electric machine may be a motor-generator that also has a function of a generator. In the above embodiment, the control unit is applied to the electric power steering apparatus. In the other embodiment, the rotary electric machine control device may be applied to an apparatus such as a steer-by-wire apparatus, which is other than the electric power steering apparatus for steering control. Further, it may be applied to an in-vehicle apparatus other than the steering apparatus or an apparatus other than the in-vehicle apparatus.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been made in accordance with the embodiments. However, the present disclosure is not limited to such embodiments and configurations. This disclosure also encompasses various modifications and variations within the scope of equivalents. Furthermore, various combination and formation, and other combination and formation including one, more than one or less than one element may be made in the present disclosure.

What is claimed is:

1. A rotary electric machine control device configured to control drive of a rotary electric machine including a multiphase coil, the rotary electric machine control device comprising:
   an inverter unit including
      a plurality of upper arm elements corresponding to phases of the coil and connected to a high potential side and
      a plurality of lower arm elements connected to a low potential side of the upper arm element and configured to be turned on and off complementarily with the upper arm elements;
   a current detection unit including a plurality of current detection elements provided to the phases on the high potential side of the upper arm elements or on the low potential side of the lower arm elements; and
   a control unit including
      a current acquisition unit configured to acquire a current detection value from the current detection unit,
      an energization control unit configured to control energization of the coil based on the current detection value, and
      an abnormality determination unit configured to perform abnormality determination based on the current detection value, wherein
   detection target elements are the upper arm elements or the lower arm elements to which the current detection elements are provided,
   a target duty is a duty ratio of the detection target elements, and
   the abnormality determination unit is configured to vary a determination threshold, which is used for the abnormality determination based on the current detection value, according to the target duty.

2. The rotary electric machine control device according to claim 1, wherein
the abnormality determination unit is configured to perform the abnormality determination based on a summation of currents of all phases at an all-on appearance timing, at which the detection target elements of the all phases are turned on, and
the determination threshold when the target duty is equal to or larger than an all-on-threshold switching duty is a value corresponding to a smaller current as compared to the determination threshold when the target duty is smaller than the all-on-threshold switching duty.

3. The rotary electric machine control device according to claim 2, wherein
the energization control unit is configured to, when an abnormality is detected by the abnormality determination based on the summation of currents of the all phases, set the target duty to be equal to or larger than the all-on-threshold switching duty, and limit energization of the coil by three-phase modulation.

4. The rotary electric machine control device according to claim 2, wherein
the determination threshold when the target duty is equal to or larger than the all-on-threshold switching duty is larger than the determination threshold when the target duty is smaller than the all-on-threshold switching duty.

5. The rotary electric machine control device according to claim 1, wherein
the abnormality determination unit is configured to perform the abnormality determination based on the current detection value of each of the phases at an all-off appearance timing at which the detection target elements of the all phases are turned off, and
the determination threshold when the target duty is equal to or smaller than an all-off-threshold switching duty is a value corresponding to a smaller current as compared to the determination threshold when the target duty is larger than the all-off-threshold switching duty.

6. The rotary electric machine control device according to claim 5, wherein
the energization control unit is configured to, when an abnormality is detected by the abnormality determination based on the current detection value of each of the phases at the all-off appearance timing, set the target duty to be equal to or less than the all-off threshold switching duty, and limit energization of the coil by three-phase modulation.

7. The rotary electric machine control device according to claim 1, wherein
the abnormality determination unit is configured to, when a reverse flow current from a ground side to a power supply side of the current detection elements is larger than a reverse flow determination threshold, cancel the abnormality determination based on the current detection value.

8. The rotary electric machine control device according to claim 1, wherein
the current detection element is a shunt resistor,
the rotary electric machine control device further comprising:
an amplifier circuit unit including
a differential amplifier circuit, which is configured to amplify a voltage across the current detection elements, and
a sample hold circuit configured to perform sample-holding of an output of the differential amplifier circuit at every ½ cycle of an on/off cycle of the detection target element.

9. A rotary electric machine control device comprising:
an inverter connected to a multi-phase coil of a rotary electric machine and including
a plurality of upper arm elements connected to a high potential side in the inverter and
a plurality of lower arm elements connected to a low potential side of the upper arm element and configured to be turned on and off complementarily with the upper arm elements;
a current detector including a plurality of current detection elements provided respectively to the high potential side of the upper arm elements or to the low potential side of the lower arm elements; and
a processor configured to
acquire a current detection value from the current detector,
control energization of the coil based on the current detection value,
perform abnormality determination based on the current detection value, and
vary a determination threshold for the abnormality determination according to a target duty, which is a duty ratio of the upper arm elements or the lower arm elements to which the current detection elements are provided.

* * * * *